(12) United States Patent
Pritchard

(10) Patent No.: US 8,919,512 B2
(45) Date of Patent: Dec. 30, 2014

(54) WET CLUTCH MODULE WITH INTEGRATED HEAT EXCHANGER

(75) Inventor: Larry A. Pritchard, Macomb, MI (US)

(73) Assignee: BorgWarner Inc., Auburn Hills, MI (US)

( * ) Notice: Subject to any disclaimer, the term of this patent is extended or adjusted under 35 U.S.C. 154(b) by 360 days.

(21) Appl. No.: 13/419,499

(22) Filed: Mar. 14, 2012

(65) Prior Publication Data

US 2012/0247903 A1 Oct. 4, 2012

Related U.S. Application Data

(60) Provisional application No. 61/516,172, filed on Mar. 30, 2011.

(51) Int. Cl.
| | | |
|---|---|---|
| *F16D 13/72* | (2006.01) | |
| *F16D 21/06* | (2006.01) | |
| *F16D 25/12* | (2006.01) | |
| *F16D 48/02* | (2006.01) | |
| *F16D 23/06* | (2006.01) | |

(52) U.S. Cl.
CPC .............. *F16D 21/06* (2013.01); *F16D 25/123* (2013.01); *F16D 48/02* (2013.01); *F16D 2021/0661* (2013.01); *F16D 2023/0693* (2013.01); *F16D 2048/029* (2013.01); *F16D 2300/26* (2013.01)
USPC .............. 192/48.603; 192/70.12; 192/113.23; 192/113.3

(58) Field of Classification Search
USPC ...................................................... 192/55.61
See application file for complete search history.

(56) References Cited

U.S. PATENT DOCUMENTS

| | | | |
|---|---|---|---|
| 3,979,973 A | | 9/1976 | Klaue |
| 4,257,554 A | | 3/1981 | Willingham |
| 4,312,311 A | | 1/1982 | Iwata |
| 4,412,551 A | | 11/1983 | Peters et al. |
| 4,658,671 A | | 4/1987 | Martin |
| 4,678,118 A | | 7/1987 | Fukami et al. |
| 4,964,459 A | | 10/1990 | Stenlund |
| 5,036,911 A | | 8/1991 | So et al. |
| 5,119,920 A | | 6/1992 | Inoue |
| 5,232,418 A | * | 8/1993 | Aoki et al. ..................... 475/271 |
| 5,237,965 A | | 8/1993 | Harima |
| 5,275,235 A | | 1/1994 | Cesaroni |
| 5,369,883 A | | 12/1994 | So et al. |
| 5,538,077 A | | 7/1996 | So et al. |
| 5,788,037 A | | 8/1998 | Forsyth et al. |
| 6,740,000 B2 | | 5/2004 | Wakayama |
| 6,830,527 B2 | | 12/2004 | Wakayama |
| 7,267,732 B2 | | 9/2007 | Tsukamoto et al. |
| 7,464,672 B2 | | 12/2008 | Vetrovec |
| 7,735,461 B2 | | 6/2010 | Vetrovec |
| 7,775,338 B2 | * | 8/2010 | Yoshida et al. ............. 192/113.3 |
| 2007/0170034 A1 | * | 7/2007 | Metzinger et al. .......... 192/70.12 |
| 2009/0008212 A1 | * | 1/2009 | Combes et al. .......... 192/113.34 |
| 2009/0111653 A1 | * | 4/2009 | Fukaya et al. ................ 477/121 |
| 2009/0205924 A1 | * | 8/2009 | Agner et al. ................ 192/87.11 |
| 2010/0096232 A1 | | 4/2010 | Buchanan et al. |

\* cited by examiner

*Primary Examiner* — Gene Crawford
*Assistant Examiner* — Mark Manley
(74) *Attorney, Agent, or Firm* — Warn Partners, P.C.

(57) ABSTRACT

An arrangement of a dual clutch transmission that incorporates a positive pressure lubrication cooler heat exchanger that is integrated into a cover of a wet clutch module of the transmission is provided. Additionally, a method of assembling a wet dual clutch transmission assembly is provided.

8 Claims, 4 Drawing Sheets

US 8,919,512 B2

WET CLUTCH MODULE WITH INTEGRATED HEAT EXCHANGER

FIELD OF THE INVENTION

The present invention relates to arrangements of dual clutch transmissions.

BACKGROUND OF THE INVENTION

Examples of dual clutch transmissions are described in U.S. patents and patent applications U.S. Pat. Nos. 5,711,409; 6,996,989; 6,887,184; 6,909,955; 2006/0101933A1; and 2006/0207655A1. It is desirable to provide a dual clutch transmission arrangement that incorporates a positive pressure lubrication cooler heat exchanger integrated into a wet clutch module cover of the transmission. It is desirable to provide a dual clutch transmission with a cover as mentioned above wherein the lubricant is delivered adjacent a bearing which allows the cover to support a main input shaft of the transmission.

SUMMARY OF THE INVENTION

To make manifest the above noted and other desires, a revelation of the present invention is brought forth. The present invention in a preferred embodiment provides an arrangement of a wet dual clutch transmission assembly having a cover with integrated heat exchanger. The arrangement includes an inner input shaft and an outer input shaft concentric with the inner input shaft. A clutch is provided having radially aligned inner and outer clutch housings. An inner hub is torsionally connected with the outer input shaft and an outer hub is torsionally connected with the inner input shaft. An outer friction pack is provided for engaging the outer clutch housing with inner hub and an inner friction pack is provided for engaging the inner clutch housing with the outer hub. A cover for a clutch module is provided. The cover has internal cooling passages for passing lubricant of the transmission. The cover also supports the inner input shaft. A dry damper is provided for delivering torque to the clutch housings and for pumping air over the cover to cool the transmission lubricant within the cover passages. The transmission also has a variable speed pump for transmitting transmission lubricant through the cover.

Other features of the invention will become more apparent to those skilled in the art as the invention is further revealed in the accompanying drawings and Detailed Description of the Invention.

DETAILED DESCRIPTION OF THE PREFERRED EMBODIMENTS

Figure 1:
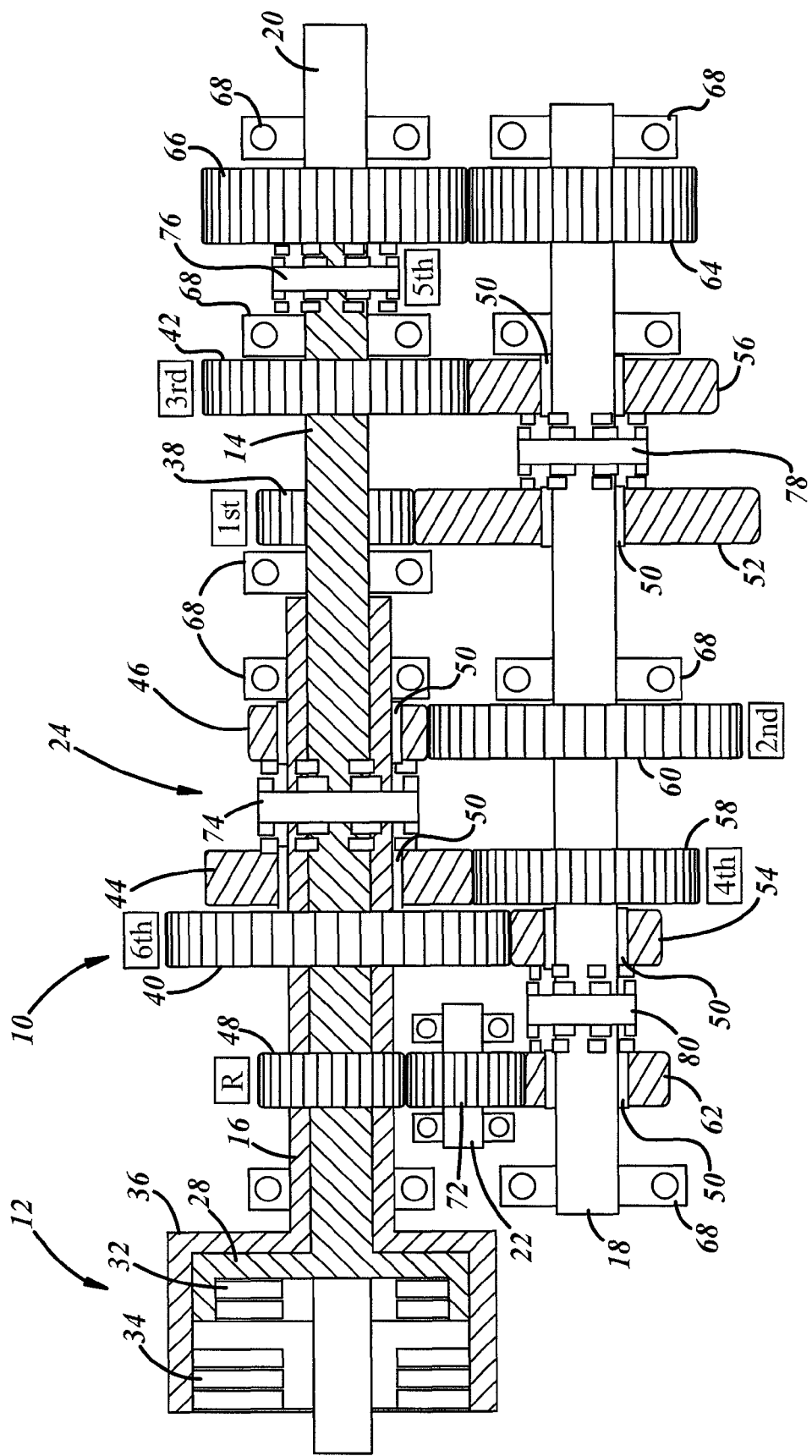
FIG. 1 is a schematic view of a dual clutch transmission that can utilize an inventive clutch module according to the present invention.
Figure 2:
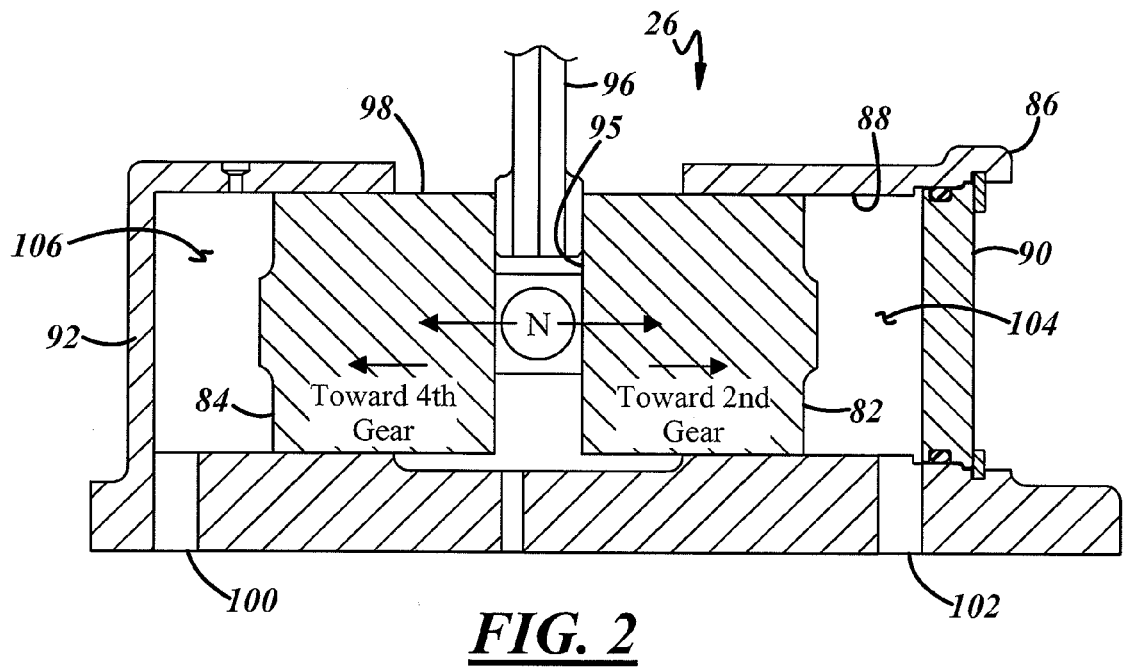
FIG. 2 is a sectioned view of a possible actuator for a synchronizer utilized in the dual clutch transmission of FIG. 1.

A representative dual clutch transmission that may be controlled by the present invention is generally indicated at 10 in the schematic illustrated in FIG. 1. Specifically, as shown in FIG. 1, the dual clutch transmission 10 includes a dual, coaxial clutch assembly generally indicated at 12, a first input shaft, generally indicated at 14, a second input shaft, generally indicated at 16, that is coaxial to the first, a counter shaft, generally indicated at 18, an output shaft 20, a reverse counter shaft 22, a plurality of synchronizers, generally indicated at 24, and a plurality of shift actuators generally indicated at 26 (FIG. 2).

The dual clutch transmission 10 forms a portion of a vehicle powertrain and is responsible for taking a torque input from a prime mover, such as an internal combustion engine, and transmitting the torque through selectable gear ratios to the vehicle drive wheels. The dual clutch transmission 10 operatively routes the applied torque from the engine through the dual, coaxial clutch assembly 12 to either the first input shaft 14 or the second input shaft 16. The input shafts 14 and 16 include a first series of gears, which are in constant mesh with a second series of gears disposed on the counter shaft 18. Each one of the first series of gears interacts with one of the second series of gears to provide the different gear ratios sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by the plurality of shift actuators 26 to selectively engage one of the alternate gear ratio sets. Thus, torque is transferred from the engine to the dual, coaxial clutch assembly 12, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual, coaxial clutch assembly 12 includes a first clutch mechanism 32 and a second clutch mechanism 34. The first clutch mechanism 32 is, in part, physically connected to a portion of the engine flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As can be seen from FIG. 1, the first and second clutch mechanisms 32, 34 are coaxial and co-centric such that the outer case 28 of the first clutch mechanism 32 fits inside of the outer case 36 of the second clutch mechanism 34. Similarly, the first and second input shafts 14, 16 are also coaxial and co-centric such that the second input shaft 16 is hollow having an inside diameter sufficient to allow the first input shaft 14 to pass through and be partially supported by the second input shaft 16. The first input shaft 14 includes a first input gear 38 and a third input gear 42. The first input shaft 14 is longer in length than the second input shaft 16 so that the first input gear 38 and a third input gear 42 are disposed on the portion of the first input shaft 14 that extends beyond the second input shaft 16. The second input shaft 16 includes a sixth input gear 40, a fourth input gear 44, a second input gear 46, and a reverse input gear 48. As shown in FIG. 1, the sixth input gear 40 and the reverse input gear 48 are fixedly supported on the second input shaft 16 and the fourth input gear 44 and second input gear 46 are rotatably supported about the second input shaft 16 upon bearing assemblies 50 so that their rotation is unrestrained unless the accompanying synchronizer is engaged, as will be discussed in greater detail below.

The counter shaft 18 is a single, one-piece shaft that includes the opposing, or counter, gears to those on the inputs shafts 14, 16. As shown in FIG. 1, the counter shaft 18 includes a first counter gear 52, a sixth counter gear 54, a third counter gear 56, a fourth counter gear 58, a second counter gear 60, and a reverse counter gear 62. The counter shaft 18 fixedly retains the fourth counter gear 58 and second counter gear 60, while first, sixth, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly mounted on the output shaft 20. The output shaft 20 extends outward from the transmission 10 to provide an attachment for the remainder of the powertrain.

The reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gears 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1.

The engagement and disengagement of the various forward and reverse gears is accomplished by the actuation of the synchronizers 24 within the transmission. As shown in FIG. 1 in this example of a dual clutch transmission 10, four synchronizers 74, 76, 78, and 80 are utilized to shift through the six forward gears and reverse. It should be appreciated that there are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the synchronizers are two sided, dual actuated synchronizers, such that they engage one gear to its respective shaft when moved off a center neutralized position to the right and engage another gear to its respective shaft when moved to the left. Specifically with reference to FIG. 1, synchronizer 78 can be actuated to the left to engage the first counter gear 52 on the counter shaft 18 or actuated to the right to engage the third counter gear 56. Synchronizer 80 can be actuated to the left to engage the reverse counter gear 62 or actuated to the right to engage the sixth counter gear 54. Likewise, synchronizer 74 can be actuated to the left to engage the fourth input gear 44 or actuated to the right to engage the second input gear 46. Synchronizer 76 is actuated to the right to directly engage the end of the first input shaft 14 to the output shaft 20 thereby providing a direct 1:1 (one to one) drive ratio for fifth gear. There is no gear set to engage to the left of synchronizer 76.

To actuate the synchronizers 74, 76, 78, and 80, this representative example of a dual clutch transmission 10 utilizes hydraulically driven shift actuators 26 with attached shift forks to selectively move the synchronizers so that they engage or disengage (neutralize) the desired gears. As shown in FIG. 2, the shift actuators 26 are essentially two way or dual hydraulic valve assemblies that are driven back and forth linearly, in parallel to one of the input shafts 14, 16 or the counter shaft 18, to move a shift fork 96, and ultimately one of the plurality of synchronizers 24 in and out of engagement. It should be appreciated from the description that follows that other types of actuators that are capable of driving a shift fork back and forth to move a synchronizer may also be employed with the method of the present invention. These include mechanical actuators, hydro-mechanical actuators, electro-mechanical actuators, electrical actuators, and the like.

Referring to FIG. 2, the hydraulically operated shift actuators 26 include an outer case 86 that includes a main bore 88 having two cylindrically shaped ends 90, 92. A piston 98 is slidably disposed within the main bore 88 of the case 86. The piston 98 includes two opposing sealed heads 82 and 84. The interaction of each piston head 82 and 84 within its respective cylinder end 90, 92 forms alpha and beta pressure or expansion chambers 106, 104.

Between the piston heads 82 and 84 is a gap. Positioned within the gap 95 is the shift fork 96. To actuate the synchronize 74 to the right to actuate the second gear ratio, fluid is injected into alpha expansion chamber 106 through inlet-outlet 100 to move the piston and shift fork 96 to the right causing synchronizer 80 to engage the second input gear 46 to the shaft 16. A detent mechanism (not shown) connected with the linkage with the shift fork 96 holds the shift fork 96 in to hold its actuated position. To release the second input gear 46 from its shaft 16, the beta expansion chamber 104 is pressurized through inlet 102 and the piston 98 and shift fork 96 are shifted back to a detented neutral position. A slight pressurization of the expansion chamber 106 is temporarily maintained to prevent overtravel of the piston 98 and inadvertent engagement of fourth input gear 44 to the shaft 16.

Figure 3:
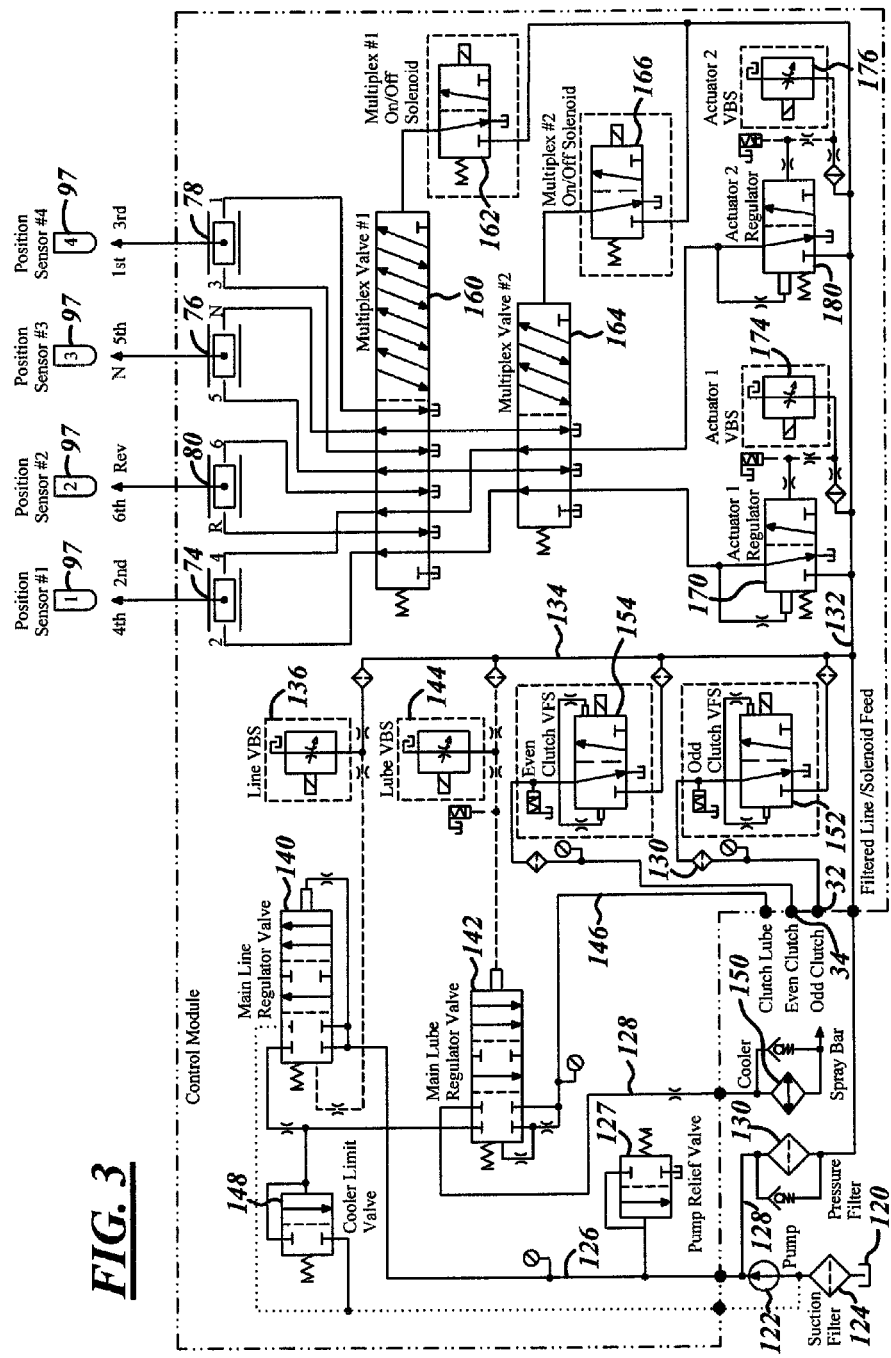
FIG. 3 is a hydraulic schematic of a possible control system of the transmission shown in FIG. 1.

FIG. 3 illustrates a hydraulic control system for the first and second clutches 32, 34 and for synchronizers 74, 76, 78 and 80. The control system 7 has an oil sump 120. To provide a source of pressurize oil or fluid, a pump 122 is connected to the sump 120 via a suction filter 124. The pump 122 delivers pressurized fluid to lines 126 and 128. A pump relief valve 127 connected to line 126 prevents over pressurization in line 126. Fluid in line 128 passes through pressure filter 130 into lines 132 and 134. The line 134 is connected with a variable bleed solenoid (VBS.) 136. The VBS 136 controls operation of a main line pressure regulator valve 140. When at least partially actuated by VBS 136, the valve 140 connects line 126 with a lube regulator valve 142. A VBS 144 controls valve 142 to control lubrication of the clutches 32, 34 via a clutch lube line 146. Clutch lube line 146 is connected with the clutch lubrication system. Valve 140 is also fluidly connected with an oil cooler limit valve 148. An outlet of the valve 148 is looped back to in inlet side of the pump 122. Valve 142 additionally delivers fluid to oil cooler 150. Variable force solenoids (VFS) 152, 154 control the pressure within their respective clutches 32 and 34 by selectively communicating to the clutches with the line 134 or with the sump 120.

The control system for the synchronizers includes a first multiplex valve 160. The first multiplex valve 160 has a first position allowing delivery of pressurize fluid to synchronizers 74 and 76. Synchronizers 78 and 80 are diverted to the sump 120. In a second position of the first multiplex valve 160 the reverse occurs allowing delivery of pressurize fluid to synchronizers 78 and 80 with synchronizers 74 and 76 being diverted to the sump. An on/off solenoid valve 162 controls operation of the first multiplex valve 160.

A second multiplex valve 164 is fluidly connected with the first multiplex valve 160. The second multiplex valve 164 has a first position allowing pressurized fluid connection of alpha and beta chambers of the synchronizer 74 (when the first multiplex valve 160 is in the first position). The alpha and beta chambers of synchronizer 76 are diverted to the sump 120. When the second multiplex valve 164 is placed in the second position by an on/off solenoid 166, the fluid connections of the second multiplex valve 164 are reversed. The alpha chambers for the synchronizers 74, 76, 78, and 80 include pressure chambers for odd and even gear ratios.

To actuate the alpha chamber there is provided a first actuator regulator valve 170. First actuator regulator valve 170 has a biased position connecting the alpha chamber to the sump 120. In a second position, the first actuator regulator valve 170 connects the alpha chamber with the line 132. A proportional solenoid valve provided by VBS solenoid valve 174 controls the first actuator regulator valve 170. In like manner, VBS 176 controls the second actuator regulator valve 180 for the beta chamber of the synchronizer 74.

To control the synchronizer 76 the first multiplex valve 160 is in the first position and the second multiplex valve is placed in the second position. To control synchronizer 80 or synchronizer 78 the first multiplex valve 160 is placed in the second position. For synchronizer 80, the second multiplex valve 164 is in the first position. For control of the synchronizer 78, the second multiplex valve 164 is placed in the second position.

To place the second input gear 46 into engagement with the shaft 16, the first multiplex valve 160 and second multiplex valve 162 are placed in the first position. The first regulator valve 170 is turned on to pressurize the alpha expansion chamber 106 moving the piston 98 and shift fork 96 to the right. A position sensor 97 is used to inform or confirm the fact to the transmission electronic controller (not shown) that the transmission 10 is in the second gear. A major advantage of the present control system for the synchronizers is that no two gears of the transmission can be actuated at the same time. If the second input gear 46 is being actuated, all of the pressure chambers of the synchronizers 80, 78 and 76 are diverted to the sump. If a control system failure causes the second actuator regulator valve 180 to pressurize the beta expansion chamber 104 of the shift actuator 26 for synchronizer 74, the pressure within the opposing beta 104 and alpha 106 expansion chambers act against each preventing any simultaneous gear activation (however when the alpha chamber 106 is depressurized the above noted failure causes the gear (fourth input gear 44) associated with the beta chamber to be stuck on). Another advantage of the present control system is that most valve failures allow at least one odd gear and at least one even gear to still operate. Failure of the first multiplex valve 160 in the first position allows operation of synchronizer 74 providing second and fourth gears. Additionally, fifth and neutral gears of synchronizer 76 are available. Upon such a failure, the transmission controller programs the transmission 10 to operate in second, fourth and fifth gear ratios dependent upon vehicle speed in a "limp" home mode of operation.

A failure of the first multiplex valve 160 in the second position still allows for operation of the reverse, six gear, third gear and first. Failure of the second multiplex valve 164 in the first position will still allow operation of the second, fourth, sixth and reverse gears. Failure of any one given actuator valve still allows for partial gear operation. Failure of the actuator regulator valve 170 in the on position will freeze (be detented) second input gear 46 with the shaft 16. To get another gear for "limp" home operation, the transmission controller opens the clutch 34. Engaged clutch 32 is utilized to rotate the shaft 14. The controller of the transmission then picks a gear ratio from a set of gear ratios associated with the shafts 14 or 20 (first, third or fifth) gear to be utilized for "limp" home mode of operation. The transmission controller then alternates between second and one gear from the set of first, third or fifth gear. As long as a forward travel gear is engaged when one of the actuator regulator valves 170, 180 fails, the transmission will have two gear ratios of forward operation in the "limp" home mode of operation.

Figure 5:
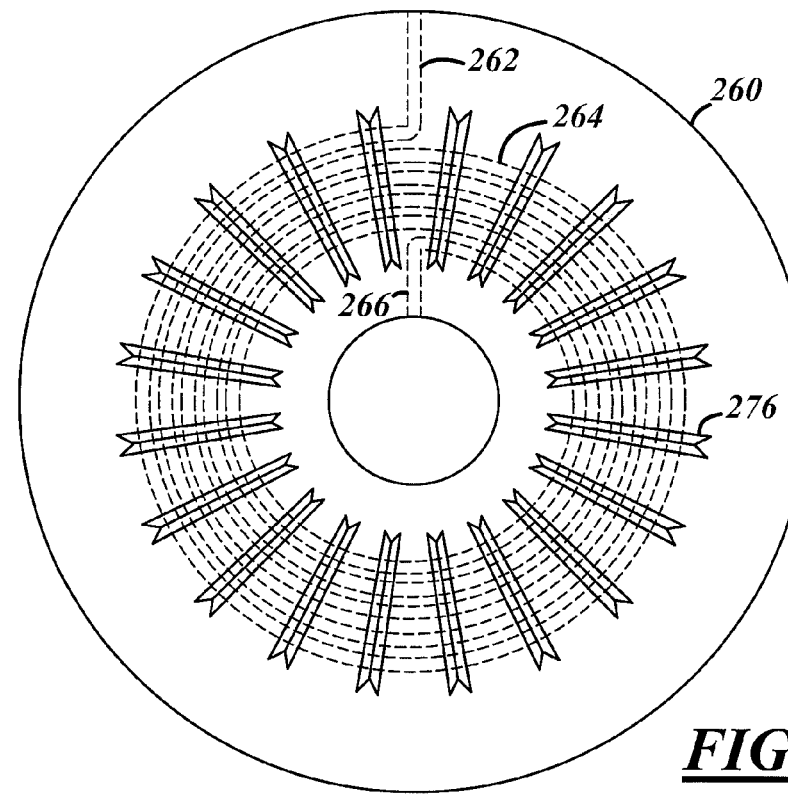
FIG. 5 is a front plane view of the cover in the wet clutch module shown in FIG. 4.
Figure 4:
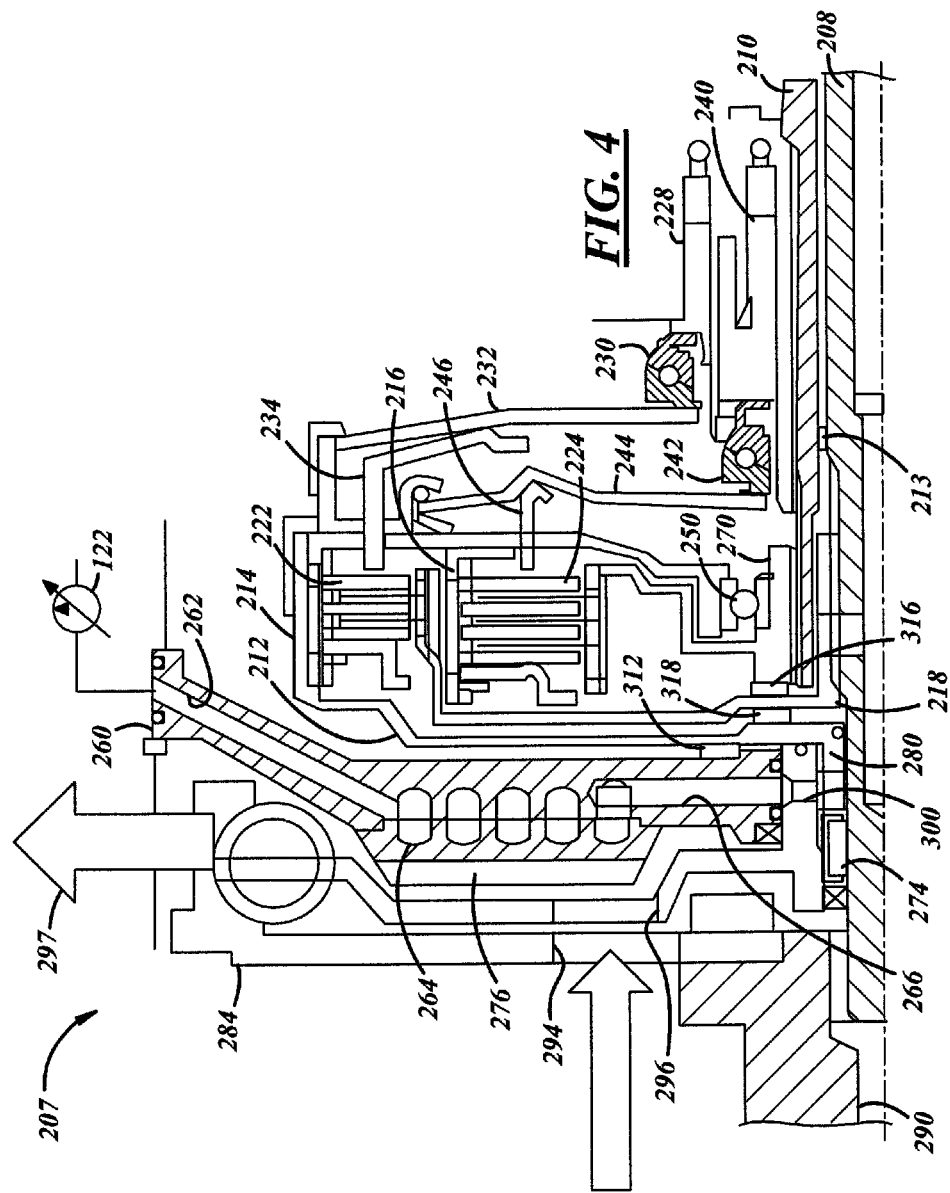
FIG. 4 is a partial sectional view of an arrangement of a dual clutch transmission according to the present invention having a wet clutch module with a cover with integrated heat exchanger according to the present invention.

Referring to FIGS. 4 and 5, a dual clutch transmission arrangement 207 of the present invention having a wet clutch module with a cover with an integrated heat exchanger is provided. FIG. 4 illustrates primarily a portion of the dual clutch transmission referred to primarily as item 12 in FIG. 1. The dual clutch arrangement 207 has an inner input shaft 208 corresponding in function to prior described input shaft 14. Concentric with the inner input shaft 208 is an outer input shaft 210. The outer input shaft 210 is supported on the inner input shaft 208 by a bearing 213. To drive the input shafts 210 and 208, there is provided a clutch 212. The clutch 212 has an outer clutch housing 214 which is radially aligned with an inner clutch housing 216. An inner hub 218 is torsionally connected with the inner shaft 208 buy a spline connection. An outer hub 270 by a spline connection is torsionally connected with the outer input shaft 210. An outer friction pack 222 which provides axially alternating friction discs and reaction plates is provided to allow for selective engagement of the outer clutch housing 214 with the inner hub 218. An inner friction pack 224 comprised of axially alternating reaction plates and friction discs is provided to allow for selective engagement of the inner clutch housing 216 with the outer hub 220. To activate the outer friction pack 222, there is provided a piston 228 which through a bearing 230 and push arm 232 positions a spring actuator 234 to engage the friction pack 222 and thereby connect the clutch 212 with the inner input shaft 208. The actuator 234 is typically spring loaded to return it to the non-engaged position upon the deacutation of the piston 228. In a similar manner, piston 240 through bearing 242, lever arm 244 and spring actuator 246 can be utilized to engage friction pack 224 to torsionally connect the clutch 212 with the outer input shaft 210. A bearing 250 allows the outer and inner hubs 270, 218 to have relative rotational movement with respect to each other, and for the outer hub 270 to support the clutch housings 214, 216.

Transmission arrangement 207 has a front cover 260. The cover 260 has an internal passage 262 which has a generally spiral portion 264 which connects with a generally straight portion 266. Connected with the passage 262 is the variable output (speed or displacement) pump 122 to selectively deliver pressurized lubricant for cooling into the passage 262. The cover, via a bearing 274 supports the inner input shaft and consequently the outer input shaft 210. The cover also has on its outer surface, a series of cooling fins 276. Torsionally connected to a lower leg 280 of the clutch by a spline connection is a damper 284. The damper 284 has one end physically connected to an output shaft 290 of the engine. The damper has aligned apertures 294 and 296 to allow for the passage of air to be sucked in by its rotating motion to be pushed against the fins 276 of the cover and then to exit the area in the direction of the arrow 297 to allow the cover to be air cooled. The cooled lubricant via passage portion 266, via a hole 300 provided in the damper leg 280 allows for the most cooled transmission lubricant to be delivered adjacent to the main support bearing 274. Actuating of the piston 228 causes a reaction force through the outer clutch housing 214 and the clutch 212 via a bearing 312 to allow the reaction force from engagement of the clutch to be into the cover 260. The bearing 312 is also adjacent the portion of the passage 266 which will have the transmission lubricant which is in the most cooled state after passage through the inner passages of the cover. Actuation of the friction pack 224 by virtue of piston 240 will cause the outer hub 270 to react into the bearing 316 and thereby cause the inner hub 218 to react into the clutch housing via bearing 318 again loading bearing 312 to cause the reaction force to react against the cover 260.

The dry damper 284 bearings 274, 312, 316, 318, and the inner and outer hubs 218, 270, and the clutch 212 along with the inner and outer clutch packs 224, 222 respectively, and lever arms 244 into 232 and bearing 250 can all be axially installed as one sub-assembly onto the input shafts 208, 210 thereby easing assembly of the transmission arrangement 207.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An arrangement of a wet dual clutch transmission assembly, said assembly comprising:
    an inner input shaft;
    an outer input shaft concentric with said inner input shaft;
    a clutch having radially aligned inner and outer clutch housings;
    an inner hub torsionally connected with said inner input shaft;
    an outer hub torsionally connected with said outer input shaft, said outer hub supporting said inner and outer clutch housings via a bearing;
    an outer friction pack for engaging said outer clutch housing with said inner hub;
    an inner friction pack for engaging said inner clutch housing with said outer hub;
    a cover with internal coolant passages for passing lubricant of said transmission, said cover supporting said inner input shaft;
    a dry damper for delivering torque to said clutch housing and pumping air over said cover to cool said transmission lubricant within said cover passages; and
    a variable output pump for transmitting transmission lubricant through said cover.

2. An arrangement of a dual clutch transmission as described in claim 1 wherein said cover and said inner and outer clutch housings and said inner and outer hubs can be assembled as one unit.

3. A transmission arrangements as described in claim 1 wherein one of said friction packs reacts into said cover upon engagement.

4. A transmission arrangement as described in claim 1 wherein both said friction packs react into said cover.

5. A transmission arrangement as described in claim 1 wherein said passage in said cover has a portion generally in the shape of a spiral.

6. A dual clutch transmission arrangement as described in claim 1 wherein said cover delivers lube oil generally adjacent a bearing holding said inner input shaft within said cover.

7. An arrangement of a wet dual clutch transmission assembly, said assembly comprising:
    an inner input shaft;
    an outer input shaft concentric with said inner input shaft;
    a clutch having radially aligned inner and outer clutch housings;
    an inner hub torsionally connected with said inner input shaft;
    an outer hub torsionally connected with said outer input shaft, said outer hub supporting said inner and outer clutch housing via a bearing;
    an outer friction pack for engaging said outer clutch housing with said inner hub;
    an inner friction pack for engaging said inner clutch housing with said outer hub;
    a cover with an internal coolant passage for passing lubricant of said transmission, said passage having a spiral portion and said passage delivers lubricant adjacent a bearing in said cover supporting said inner input shaft and wherein said outer friction pack reacts into said cover via a bearing positioned between said inner hub and said clutch and a bearing between said clutch and said cover and said inner friction pack reacts into said cover via a bearing between said outer hub and said inner hub, said bearing between said inner hub and said clutch and said bearing between clutch and said cover, and said passage also passes within said cover adjacent said bearing between said clutch and said cover;
    a dry damper for delivering torque to said clutch housing and pumping air over said cover to cool said transmission lubricant within said cover passages; and
    a variable output pump for transmitting transmission lubricant through said cover.

8. An arrangement of a wet dual clutch transmission assembly, said assembly comprising:
    an inner input shaft;
    an outer input shaft concentric with said inner input shaft;
    a clutch having radially aligned inner and outer clutch housings;
    an inner hub torsionally connected with said inner input shaft;
    an outer hub torsionally connected with said inner input shaft;
    an outer hub torsionally connected with said outer input shaft;
    an outer friction pack for engaging said outer clutch housing with said inner hub;
    an inner friction pack for engaging said inner clutch housing with said outer hub;
    a cover with an integral coolant passage generally shaped as a spiral for passing lubricant of said transmission, said cover supporting said inner input shaft via a bearing;
    a dry damper for delivering torque to said clutch housing and pumping air over said cover radially outward to cool said transmission lubricant within said cover passages; and
    a pump for transmitting transmission lubricant radially inward to an area adjacent said cover bearing supporting inner input shaft.

* * * * *